Dec. 1, 1959 H. F. STARKE 2,915,600

TRANSISTOR STABILIZATION CIRCUITS

Filed April 25, 1955

INVENTOR
HERBERT F. STARKE
BY Elmer J. Gorn
ATTORNEY

United States Patent Office 2,915,600

Patented Dec. 1, 1959

2,915,600

TRANSISTOR STABILIZATION CIRCUITS

Herbert F. Starke, Watertown, Mass., assignor to Raytheon Company, Waltham, Mass., a corporation of Delaware Application April 25, 1955, Serial No. 503,519

3 Claims. (Cl. 179—171)

This invention relates generally to semiconductor amplifier circuits and, more particularly, to means for stabilizing the operating point of such circuits, with particular emphasis on those of the common emitter type.

In the utilization of transistors, one of the major problems encountered is that of supplying relatively constant current to the various elements. In the case of junction transistors, the problem is further complicated by the fact that operation is feasible at very low current and voltage values. Consequently, it is desirable to make the greatest possible use of this potential efficiency. Unfortunately, however, zero-emitter current and, as a result, collector current, vary both between different transistors, and with temperature in the same transistor. This variation with temperature may be as high as 10 to 1, and with some circuit configurations, particularly the common emitter circuit, may produce a variation of this order of magnitude in the collector current. In a resistance coupled amplifier circuit, this may result in the operating point shifting in such a manner as to materially reduce the gain. In power amplifiers, the shift may produce an increase in internal heating which in turn causes a further increase in current. If this condition becomes accumulative, the transistor may either destroy itself or drift to a relatively inoperative condition, as, for example, when the net collector-base voltage drops to zero.

In accordance with the present invention, an improved transistor circuit is provided wherein the device may be stabilized against undesirable drift in collector current by utilizing a compensating voltage derived from the output, and fed back to the input through temperature responsive impedance elements. The feedback voltage acts to reduce any rise in collector current by reducing the current being fed to the base, while the impedance elements, chosen with appropriate sign of temperature coefficient of resistance, act to further counteract any collector current change, thus providing an essentially constant operating current even though the device be subjected to extreme variations of ambient temperature.

Figure 1:
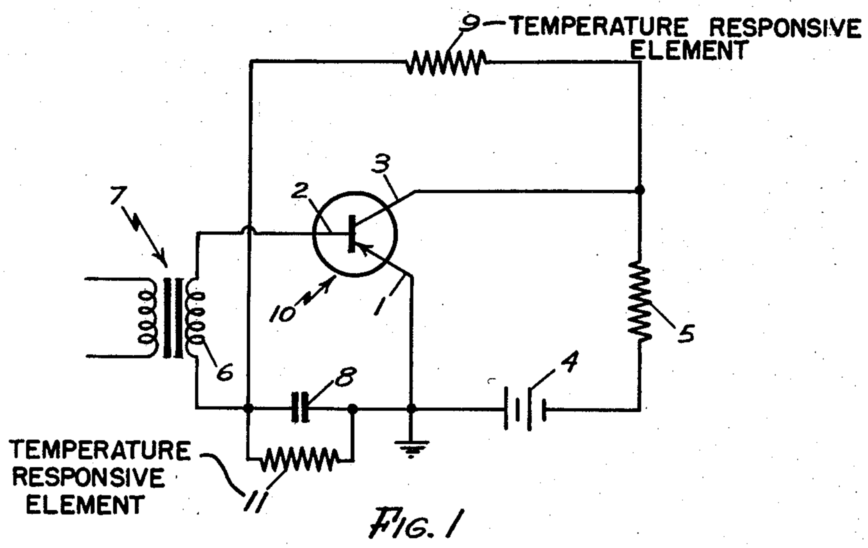
Figure 2:
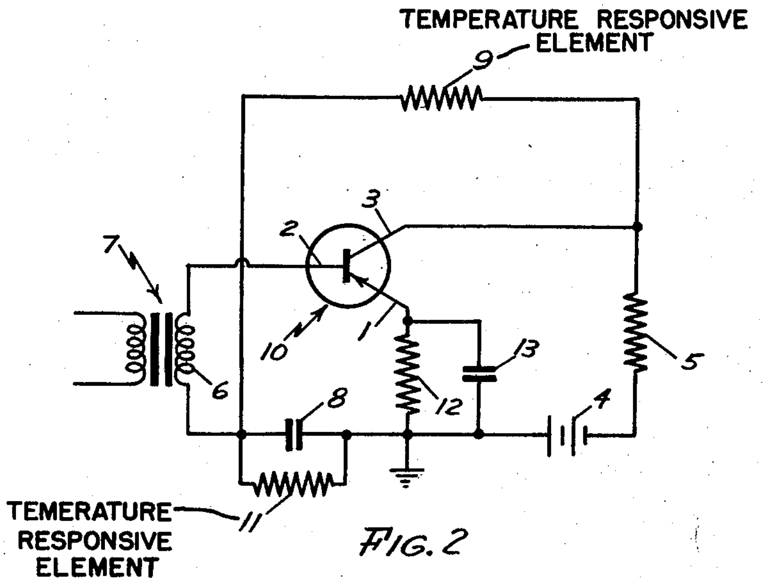

The invention will be better understood as the following description proceeds, taken in conjunction with the accompanying drawing wherein:

Fig. 1 is a schematic diagram of a transistor amplifier in accordance with the invention; and Fig. 2 is a schematic diagram of a modified transistor amplifier similar to that of Fig. 1.

Referring now to the drawing and, more particularly, to Fig. 1 thereof, there is shown generally at 10 a transistor having an emitter 1, a base 2, and a collector 3. In order to bias transistor 10, a suitable source of potential, such as battery 4, has its negative terminal connected to collector electrode 3 through a load resistor 5, and its positive terminal grounded. The biasing arrangement shown is applicable when transistor 10 is of the so-called PNP type, but it should be understood that an NPN transistor can be used, thus necessitating only a reversal of the biasing polarity. As is well known in the art, an incoming alternating current signal may be applied to base electrode 2 through an input circuit comprising the secondary winding 6 of transformer 7 and coupling condenser 8, and an amplified replica of the signal may be derived across the output circuit shown as load resistor 5.

In accordance with the present invention, the amplifier circuit shown may be stabilized against temperature-induced changes in collector current flowing through resistor 5 by providing a plurality of temperature responsive impedance elements 9 and 11, connected between output and input circuits, which tend to counteract any change in the collector current by a twofold action. In operation, a rise in collector current causes the drop through load resistor 5 to increase which, in turn, causes the voltage between the collector and emitter to decrease. Since the base obtains its voltage from the same source 4 as collector 3 through resistor 5 and the base divider comprising resistors 9 and 11, less current is supplied to base 2, thus reducing the attempted rise in collector current. As a further feature of the invention, resistor 11 is chosen so as to have a relatively large negative temperature coefficient, with the result that more of the current supplied by resistor 9 will be shunted out of the base 2 as the temperature rises. As a result of this action, the sum of $I_{co}$, the zero-emitter current, and $I_b$, the base current, and therefore the collector current, will remain more nearly constant. At the same time, resistor 9 is chosen so as to have a positive temperature coefficient, thus providing still a further degree of correction and stabilization. If desired, still further stabilization may be achieved by including an external resistor 12 in series with the emitter 1, and by-passed at audio frequencies by condenser 13, as shown in the modified circuit of Fig. 2. In all other respects the circuits of Figs. 1 and 2 are identical.

Although there has been described what are considered to be preferred embodiments of the present invention, various adaptations and modifications thereof may be made without departing from the spirit and scope of the invention as defined in the appended claims.

What is claimed is:

1. An electrical circuit comprising a transistor having at least an emitter electrode, a collector electrode, and a base electrode, means for biasing said transistor, an input circuit including the secondary winding of an input transformer, one end of said winding being directly connected to a first of said electrodes, a condenser connected in series between the other end of said winding and a second of said electrodes, said second electrode being common to both said input circuit and to an output circuit including a load impedance connected between another of said electrodes and said second electrode, a temperature responsive impedance element having a positive temperature coefficient of resistance connected between said other electrode and the junction point of the connection between said secondary winding and said condenser, and a temperature responsive impedance element having a negative temperature coefficient of resistance connected across said condenser between said junction point and said second electrode.

2. An electrical circuit comprising a transistor having at least an emitter electrode, a base electrode, and a collector electrode, means for biasing said transistor, an input circuit including the secondary winding of an input transformer, one end of said winding being directly connected to a first of said electrodes, a condenser connected in series between the other end of said winding and a second of said electrodes, said second electrode being common to both said input circuit and to a load circuit connected to a third of said electrodes and said second electrode, a temperature responsive impedance element having a positive temperature coefficient of resistance and having one end connected to the junction point of the connection between said secondary winding and said condenser and having its other end connected to said third electrode, and a temperature responsive impedance element having a negative temperature coefficient of resistance connected across said condenser.

3. An electrical circuit comprising a transistor having an emitter electrode, a collector electrode, and a base electrode, means for biasing said transistor, an input circuit including the secondary winding of an input transformer, one end of said winding being directly connected to said base electrode, a condenser connected in series between the other end of said winding and said emitter electrode, an output circuit including a load impedance connected between said collector and said emitter electrodes, a temperature responsive resistive element having a positive temperature coefficient of resistance having one end connected to the junction point between said collector electrode and said load impedance and the other end connected to the junction point of the connection between said secondary winding and said condenser, and a temperature responsive resistive element having a negative temperature coefficient of resistance connected across said condenser from the junction point of said secondary winding and said condenser to said emitter electrode.

References Cited in the file of this patent

UNITED STATES PATENTS

| | | |
|---|---|---|
| 2,431,306 | Chatterjea | Nov. 25, 1947 |
| 2,517,960 | Barney et al. | Aug. 8, 1950 |
| 2,693,572 | Chase | Nov. 2, 1954 |
| 2,750,456 | Waldhauer | June 12, 1956 |
| 2,801,297 | Becking et al. | July 30, 1957 |

OTHER REFERENCES

Shea text: "Principles of Transistor Circuits," pp. 120–122, pp. 168–179, published 1953 by John Wiley and Sons, N.Y.